US010990705B2

(12) United States Patent
Yang et al.

(10) Patent No.: US 10,990,705 B2
(45) Date of Patent: Apr. 27, 2021

(54) INDEX CREATION FOR DATA RECORDS

(71) Applicant: Advanced New Technologies Co., Ltd., George Town (KY)

(72) Inventors: Xinying Yang, Hangzhou (CN); Li Lin, Hangzhou (CN); Le Zhang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/885,958

(22) Filed: May 28, 2020

(65) Prior Publication Data

US 2020/0334382 A1 Oct. 22, 2020

Related U.S. Application Data

(63) Continuation of application No. PCT/CN2020/078419, filed on Mar. 9, 2020.

(30) Foreign Application Priority Data

Apr. 18, 2019 (CN) .......................... 201910313710.2
Apr. 18, 2019 (CN) .......................... 201910313734.8
Apr. 18, 2019 (CN) .......................... 201910314543.3

(51) Int. Cl.
*G06F 21/64* (2013.01)
*G06F 16/903* (2019.01)
(Continued)

(52) U.S. Cl.
CPC ............ *G06F 21/64* (2013.01); *G06F 16/901* (2019.01); *G06F 16/90335* (2019.01); *H04L 9/0637* (2013.01); *H04L 2209/38* (2013.01)

(58) Field of Classification Search
CPC . G06F 21/64; G06F 16/90335; H04L 9/0637; H04L 2209/38
(Continued)

(56) References Cited

U.S. PATENT DOCUMENTS 10,243,748 B1 * 3/2019 Callan .................. H04L 9/3263
2017/0236123 A1 * 8/2017 Ali ...................... G06Q 20/3825
705/75

(Continued)

FOREIGN PATENT DOCUMENTS

CN 101620617 1/2010
CN 107239479 10/2017
(Continued)

OTHER PUBLICATIONS

Marinho et al. "Using a Hybrid Approach to Data Management in Relational Database and Blockchain: a Case Study on The E-health Domain", 2020 IEEE International Conference on Software Architecture Companion, 2020, pp. 114-121. (Year: 2020).*

(Continued)

*Primary Examiner* — Peter C Shaw
(74) *Attorney, Agent, or Firm* — Fish & Richardson P.C.

(57) ABSTRACT

A computer-implemented index creation method includes obtaining, by a server storing data in a blockchain ledger, an identifier, in which the identifier identifies an attribute value of a data record; determining location information of the data record in the blockchain ledger, in which the location information includes a block height of a data block in which the data record is located and an offset of the data record in the data block; and writing the location information into an index, in which the index stores a correspondence between the location information and the attribute value, the attribute value being used as a primary key in the index.

17 Claims, 9 Drawing Sheets

(51) Int. Cl.
*G06F 16/901* (2019.01)
*H04L 9/06* (2006.01)
(58) Field of Classification Search
USPC .......................................................... 726/26
See application file for complete search history.

(56) References Cited

U.S. PATENT DOCUMENTS

| | | |
|---|---|---|
| 2017/0250815 A1 | 8/2017 | Cuende |
| 2019/0042620 A1 | 2/2019 | Garagiola et al. |
| 2019/0065709 A1 | 2/2019 | Salomon |
| 2020/0005292 A1* | 1/2020 | Mao ...................... H04L 9/3247 |

FOREIGN PATENT DOCUMENTS

| | | |
|---|---|---|
| CN | 107273556 | 10/2017 |
| CN | 107515901 | 12/2017 |
| CN | 107729383 | 2/2018 |
| CN | 107807951 | 3/2018 |
| CN | 107943951 | 4/2018 |
| CN | 109165224 | 1/2019 |
| CN | 109299336 | 2/2019 |
| CN | 109408551 | 3/2019 |
| CN | 110162526 | 8/2019 |
| CN | 110162662 | 8/2019 |
| CN | 110188096 | 8/2019 |
| TW | 201837747 | 10/2018 |
| WO | WO 2018205137 | 11/2018 |
| WO | WO-2020029931 A1 * | 2/2020 |

OTHER PUBLICATIONS

Using a Hybrid Approach to Data Management in Relational Database and Blockchain: A Case Study on the E-health Domain, 2020 IEEE International Conference on Software Architecture Companion, 2020, pp. 114-121 (Year: 2020).*

International Search Report and Written Opinion in International Application No. PCT/CN2020/078419, dated Jun. 15, 2020, 19 pages (with machine translation).

Crosby et al., "BlockChain Technology: Beyond Bitcoin," Sutardja Center for Entrepreneurship & Technology Technica Report, Oct. 16, 2015, 35 pages.

Nakamoto, "Bitcoin: A Peer-to-Peer Electronic Cash System," www.bitcoin.org, 2005, 9 pages.

* cited by examiner

INDEX CREATION FOR DATA RECORDS

CROSS-REFERENCE TO RELATED APPLICATIONS

This application is a continuation of PCT Application No. PCT/CN2020/078419, filed on Mar. 9, 2020, which claims priority to Chinese Patent Application No. 201910313710.2, filed on Apr. 18, 2019, Chinese Patent Application No. 201910314543.3, filed on Apr. 18, 2019, and Chinese Patent Application No. 201910313734.8, filed on Apr. 18, 2019, and each application is hereby incorporated by reference in its entirety.

TECHNICAL FIELD

Implementations of the present specification relate to the field of information technologies, and in particular, to index creation methods, apparatuses, and devices for data records.

BACKGROUND

When a centralized database server provides services externally by using a blockchain-type ledger that stores data based on a blockchain data structure (e.g., in a form of a blockchain), the ledger records relevant data records that related users need to store.

In practice, the centralized database server is generally connected to an enterprise user, and data records that the enterprise user needs to store often have different service attributes, such as sources, users, and projects of the data records. Data records related to the same service attribute are often distributed in the blockchain-type ledger. It's inconvenient to count, verify, and query the data records related to the same service attribute.

Therefore, an index creation scheme for a service attribute of a data record is needed.

SUMMARY

In view of this, implementations of the present specification provide index creation methods in a centralized blockchain-type ledger.

According to one aspect, an implementation of the present specification provides an index creation method for a data record, applied to a centralized database server that stores data by using a blockchain-type ledger, and the method includes: obtaining a specified identifier in a data record, where the specified identifier is used to identify a service attribute of the data record; determining location information of the data record in the ledger, where the location information includes a block height of a data block in which the data record is located and an offset of the data record in the data block; and establishing a correspondence between the specified identifier and the location information, and writing the location information into an index that uses specified identifiers as primary keys; where in the blockchain-type ledger, except an initial data block, each data block includes at least one data record, each data block includes a hash value of the data block determined based on a hash value of a previous data block and the data record included in the data block, and block heights of data blocks are increased monotonically based on an order of blocking moments.

According to another aspect, an implementation of the present specification provides a method for querying a data record in a blockchain-type ledger based on the previous index, including: receiving a query instruction that includes a specific value of a service attribute; performing matching in a pre-created index table based on the specific value of the service attribute to determine location information corresponding to the specific value of the service attribute in the index table; and obtaining a corresponding data record from the ledger based on the location information, and returning the obtained corresponding data record to a query instruction sender.

According to still another aspect, an implementation of the present specification provides a method for verifying a data record in a blockchain-type ledger based on the previous index, including: receiving a verification instruction that includes a specific value of a service attribute; performing matching in a pre-created index table based on the specific value of the service attribute to determine location information corresponding to the specific value of the service attribute in the index table; and performing integrity verification on a data record and/or a data block corresponding to the location information.

Corresponding to the one aspect, an implementation of the present specification further provides an index creation apparatus for a data record, applied to a centralized database server that stores data by using a blockchain-type ledger, and the apparatus includes: an acquisition module, configured to obtain a specified identifier in a data record, where the specified identifier is used to identify a service attribute of the data record; a determining module, configured to determine location information of the data record in the ledger, where the location information includes a block height of a data block in which the data record is located and an offset of the data record in the data block; and a writing module, configured to establish a correspondence between the specified identifier and the location information, and write the location information into an index that uses specified identifiers as primary keys; where in the blockchain-type ledger, except an initial data block, each data block includes at least one data record, each data block includes a hash value of the data block determined based on a hash value of a previous data block and the data record included in the data block, and block heights of data blocks are increased monotonically based on an order of blocking moments.

Corresponding to the another aspect, an implementation of the present specification further provides an apparatus for querying a data record in a blockchain-type ledger based on the previous index, including: an instruction receiving module, configured to receive a query instruction that includes a specific value of a service attribute; a location information acquisition module, configured to perform matching in a pre-created index table based on the specific value of the service attribute to determine location information corresponding to the specific value of the service attribute in the index table; and a data record acquisition module, configured to obtain a corresponding data record from the ledger based on the location information, and return the obtained corresponding data record to a query instruction sender.

Corresponding to the still another aspect, an implementation of the present specification further provides an apparatus for verifying a data record in a blockchain-type ledger based on the previous index, including: an instruction receiving module, configured to receive a verification instruction that includes a specific value of a service attribute; a location information acquisition module, configured to perform matching in a pre-created index table based on the specific value of the service attribute to determine location information corresponding to the specific value of the service attribute in the index table; and a verification module, configured to perform integrity verification on a data record and/or a data block corresponding to the location information.

According to the solutions provided in the implementations of the present specification, for a data record written into the ledger, a service attribute and a storage location of the data record in the ledger are determined, a correspondence between the two is established, and an inverted index that uses the service attribute as a primary key is created, so operations such as statistics, query, and verification can be performed on the data record based on the index, thereby improving operation efficiency.

DESCRIPTION OF IMPLEMENTATIONS

To make a person skilled in the art better understand the technical solutions in the implementations of the present specification, the following describes in detail the technical solutions in the implementations of the present specification with reference to the accompanying drawings in the implementations of the present specification. Clearly, the described implementations are merely some but not all of the implementations of the present specification. All other implementations obtained by a person of ordinary skill in the art based on the implementations of the present specification shall fall within the protection scope of the present specification.

Figure 1:
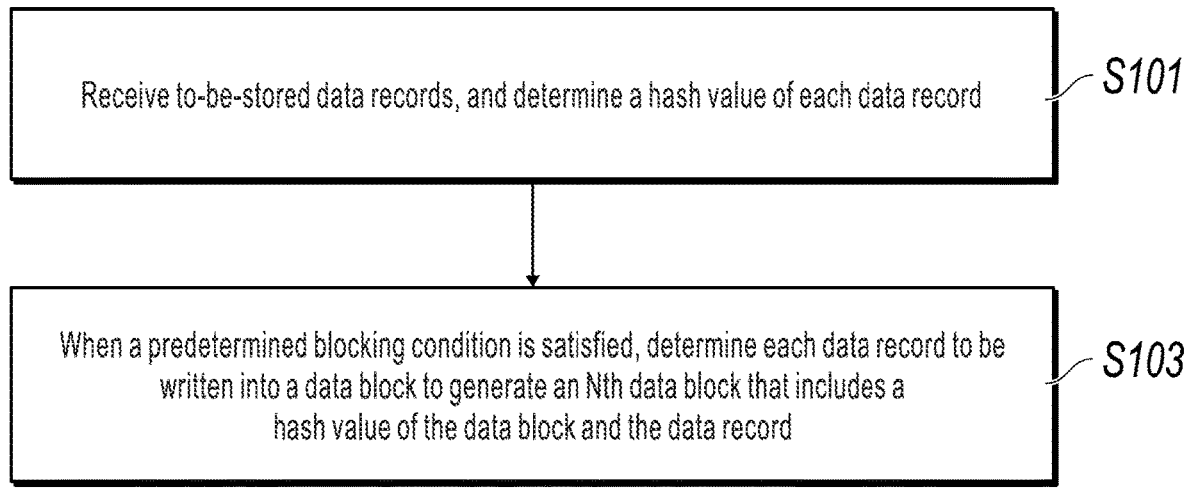
FIG. 1 is a schematic flowchart of generating a blockchain-type ledger, according to an implementation of the present specification.

First, a centralized blockchain-type ledger in the implementations of the present specification is described. On a centralized database server, a blockchain-type ledger is generated as follows. FIG. 1 is a schematic flowchart of generating a blockchain-type ledger according to an implementation of the present specification, which includes:

S101. Receive to-be-stored data records, and determine a hash value of each data record, where the to-be-stored data records here can be various consumption records of an individual user of a client, or can be a service result, an intermediate state, an operation record, etc. that are generated when an application server executes service logic based on an instruction of the user; specific service scenarios can include a consumption record, an audit log, a supply chain, a government supervision record, a medical record, etc.

S103. When a predetermined blocking condition is satisfied, determine each data record to be written into a data block to generate an Nth data block that includes a hash value of the data block and the data record.

The predetermined blocking condition includes: The quantity of to-be-stored data records reaches a quantity threshold. For example, each time one thousand data records are received, one new data block is generated, and the one thousand data records are written into the block. Or a time interval counting from a previous blocking moment reaches a time threshold. For example, one new data block is generated every five minutes, and a data record received within the five minutes is written into the block.

N refers to a serial number of a data block. In other words, in this implementation of the present specification, data blocks are arranged in a form of block-chain and in an order of blocking moments, and have a strong time sequence characteristic. Block heights of the data blocks are monotonically increased based on an order of blocking moments. The block height can be a serial number, and in this case, the block height of the Nth data block is N. The block height can also be generated in another method.

When N=1, the data block is an initial data block. A hash value and a block height of the initial data block are given based on a predetermined method. For example, the initial data block does not include a data record, a hash value is any given hash value, and a block height blknum=0. For another example, a trigger condition for generating the initial data block is consistent with a trigger condition for another data block, but the hash value of the initial data block is determined by hashing all content in the initial data block.

When N>1, because content and a hash value of a previous data block are determined, a hash value of a current data block (the Nth data block) can be generated based on the hash value of the previous data block (that is, the (N−1)th data block). For example, in a feasible method, hash values of all data records to be written into the Nth block are determined, and a Merkle tree is generated based on an arrangement order of the data records in the block. A root hash value of the Merkle tree is concatenated with the hash value of the previous data block to generate the hash value of the current data block by using a hash algorithm. For another example, a hash value of the entire data record can be obtained by performing concatenation and hashing based on the order of data records in the block. The hash value of the entire data record is concatenated with the hash value of the previous data block to obtain a character string. A hash operation is performed on the character string to generate the hash value of the data block.

After successfully uploading data, the user can obtain a hash value of a corresponding data record and a hash value of a data block in which the data record is located, store the hash value, and initiate integrity verification based on the hash value. A specific verification method is that the hash value of the data record itself and the hash value of the data block in which the data record is located are recalculated in the database and compared with locally stored hash values.

In the previous data block generation method, each data block is determined by using a hash value, and the hash value of the data block is determined by content and an order of data records in the data block, and a hash value of a previous data block. The user can initiate verification at any time based on the hash value of the data block. Modification to any content in the data block (including the content or the order of data records in the data block) causes a difference between a hash value of the data block calculated during verification and a hash value of the data block during generation, which causes a verification failure. Thus, the method can achieve immutability under centralization.

When verification is performed on the blockchain-type ledger, generally, a segment of data blocks is specified for continuous integrity verification, or continuous integrity verification is performed starting from the initial data block. A verification method is: obtaining a hash value of a previous data block, and recalculating a hash value of a current data block based on a data record of the current data block and the hash value of the previous data block by using the same algorithm used for generating the hash value of the current data block.

Figure 2:
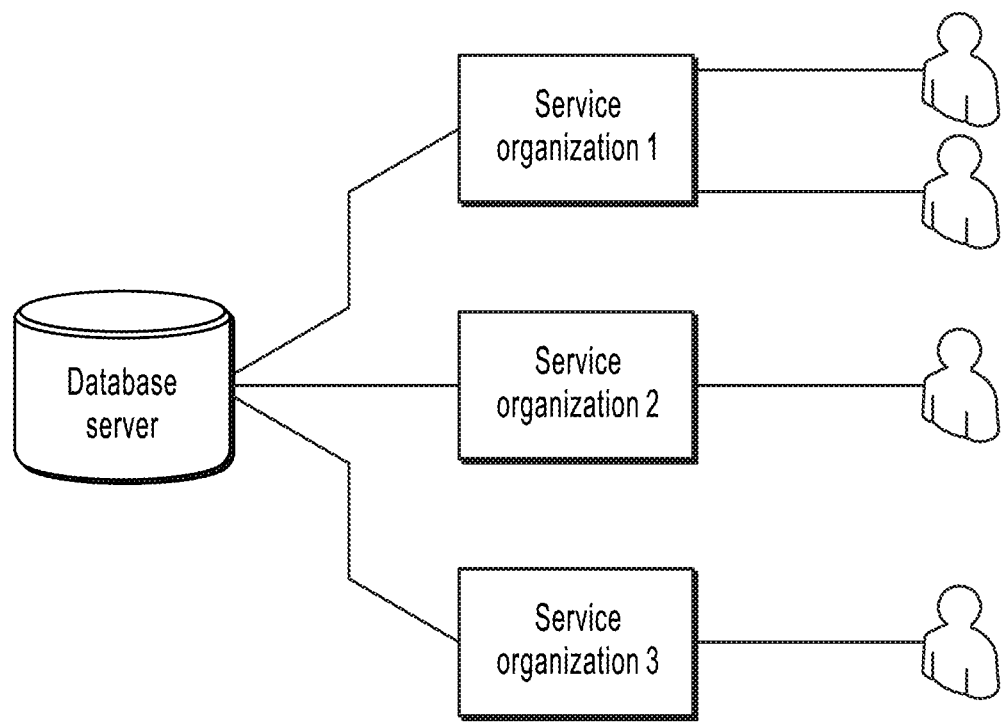
FIG. 2 is a schematic architectural diagram illustrating a system, according to an implementation of the present specification.

The previous part describes the blockchain-type ledger involved in this implementation of the present specification. In practice, a database server is often oriented to various organizations, and each organization can store, on the database server, data records generated between the organization and third-party users (including other organizations or individuals). FIG. 2 is a schematic architectural diagram illustrating a system, according to an implementation of the present specification. In this schematic diagram, one enterprise organization can be oriented to multiple users, and each user can query a database server through its corresponding enterprise organization.

For example, the database server is connected to a certain financial product company, and the data record can be a financial record of an individual user in the financial product company. Or the connected organization can be a government department, and the data record is detailed spending of the government department for a public project managed by the department. Or the database server is connected to a certain hospital, and the data record is a medical record of a patient. Or an organization connected to the database server is a third-party payment organization, and the data record can be a payment record of an individual user by using the organization, etc.

As described above, although these data records already have a relatively strong time sequence feature when they are written into the ledger, for a user, the data records are generally distributed and stored in multiple data blocks. For example, medical records of all patients in a hospital are uploaded in order of time. A certain user in the hospital may have multiple medical records with relatively large time intervals. If the hospital or the user needs to select a data record of the user from the ledger, it is inconvenient to query the data record from the ledger based on a hash value that is of each medical record and that is previously determined at the time of storage.

Based on this, an implementation of the present specification provides an index creation method for a data record, and the method is applied to a centralized database server that stores data by using a blockchain-type ledger, so an inverted index that uses a service attribute as a primary key can be created without needing to understand service details of a connected organization, thereby facilitating service processing of the connected organization and improving user experience.

Figure 3:
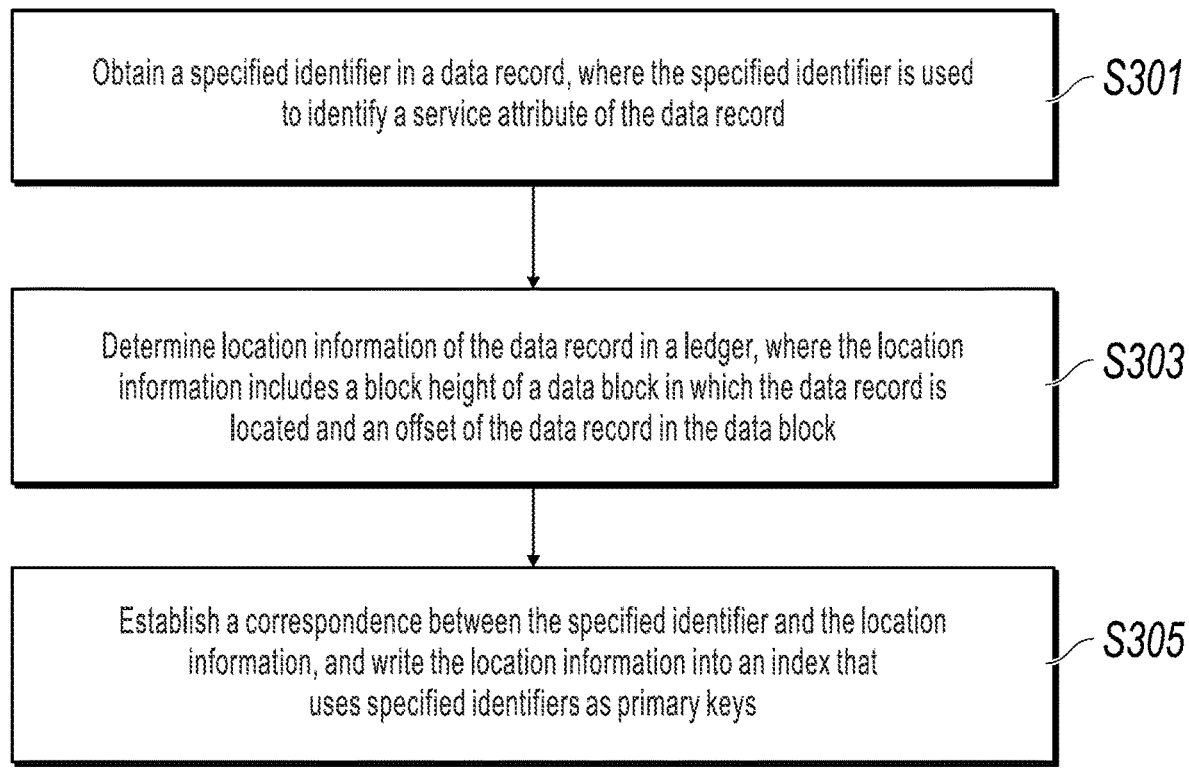
FIG. 3 is a schematic flowchart illustrating an index creation method for a data record, according to an implementation of the present specification.

The technical solutions provided in the implementations of the present specification are described in detail below with reference to the accompanying drawings. FIG. 3 is a schematic flowchart illustrating an index creation method for a data record according to an implementation of the present specification. The procedure specifically includes the following steps:

S301. Obtain a specified identifier in a data record, where the specified identifier is used to identify a service attribute of the data record.

In each organization connected to a database server, the service attribute generally exists uniquely in the connected organization. The service attribute can include a user name, a user identity card number, a driver license number, a mobile phone number, an item unique number, etc. based on different service scenarios.

For example, for a third-party payment institution, the data record is a consumption record of a user, and in this case, the service attribute is a user identifier (including a mobile phone number, an identity card number, a user name, etc.), or a hash value obtained by performing a hash algorithm on the user identifier. Or for a government organization, if the data record is a spending details of multiple public projects, the service attribute in this case can be a unique number of each project.

A specific location and an obtaining method of the specified identifier can be negotiated in advance by the database server and the connected organization. For example, when a data record provided by the connected organization is a standard structured data record, the specified identifier can be obtained by specifying an offset in the data record, or a starting location and an ending location are identified by a specific character. Or when the data record provided by the connected organization is unstructured data, a header that includes the service attribute can be directly concatenated on the beginning of each data record when the connected organization uploads the data record, and the database server can directly obtain the specified identifier of each data record from the header.

S303. Determine location information of the data record in the ledger, where the location information includes a block height of a data block in which the data record is located and an offset of the data record in the data block.

As mentioned above, one blockchain-type ledger includes multiple data blocks, and one data block usually includes multiple transactions. Therefore, in the implementation of the present specification, the location information specifically refers to a data block in which a data record is located in the ledger when the data record is stored.

In the data block provided in this implementation of the present specification, multiple methods can be used to identify different data blocks, including a hash value or a block height of a data block.

A hash value of a data block is a hash value obtained by performing hash calculation based on a hash value of a previous block and a data record of the data block, and can be used to uniquely and explicitly identify a data block. In a blockchain-type ledger, generally, a block height of the first data block is 0, and the block height increases by 1 each time one data block is added later. Or blocking moments of data blocks can be converted into a large monotonically increasing integer data (generally 12 to 15 bits) sequence, and used as block heights of the data blocks. Therefore, one data block usually has a definite block height.

For another example, in a determined data block that needs to be written to a database, ranking of data records is also fixed. Therefore, an order number of a data record in the data block is also determined. When a length of the data record is a fixed unit, the order number can also be used to determine location information of the data record in the data block in which the data record is located.

In addition, because a data block usually includes multiple data records, address offsets of the data records in the data block can be used to separately identify the data records in the data block. Clearly, in the same data block, address offsets of data records are different.

Certainly, in the method provided in this implementation of the present specification, a specific format of the data block can be customized (for example, metadata information and comment information that are included in a block header of the data block, and a form of the block height of the data block). In different formats, content of the location information can also be different, which does not constitute a limitation on this solution.

S305. Establish a correspondence between the specified identifier and the location information, and write the location information into an index that uses specified identifiers as primary keys.

That is, the index is an inverted index. In this index, the primary key is a service attribute included in the data record. A specific writing method is as follows: When the primary keys in the index do not include the specified identifier, an index record that uses the specified identifier as the primary key is created in an index table.

When the primary keys in the index include the specified identifier, the location information is written into an index record corresponding to the specified identifier. It is worthwhile to note that the writing here is not overwriting, but the location information is added to a value of the index record and coexists with other location information in the index record.

As shown in Table 1, Table 1 is an example index table provided in this implementation of the present specification. Key is a specific value of the service attribute, and each array of the Value part is one piece of location information. The first part of the array is a block height, and the second part is an order number of a data record in the data block. A data record can be uniquely determined by using the block height and the order number. It is easy to understand that in the index table, one key can be corresponding to multiple pieces of location information.

TABLE 1

| Key | Value |
|---|---|
| 0X123456 | (2.08), (2.10), (300.89), (300.999) |
| 344X0001 | (5.01), (8.22) |
| ... | ... |

According to the solution provided in this implementation of the present specification, for a data record written into the ledger, a service attribute and a storage location of the data record in the ledger are determined, a correspondence between the two is established, and an inverted index that uses the service attribute as a primary key is created, so corresponding statistics and subsequent query and verification can be performed on the data record based on the service attribute in the index without needing to understand service details of a user.

When some statistics are performed on data records, only the index table needs to be used. For example, the connected organization needs to count the quantity of data records of each user, or a user wants to know the quantity of data records between the user and the connected organization. In this case, only the quantity of Value after each Key value in the index table needs to be counted.

In an implementation, when the database server obtains a specified identifier in a data record, an obtaining method can be synchronously creating an index when a service attribute is directly obtained through parsing upon receiving of a data record and a data block is written into the ledger. In another method, after a data block is written into the ledger, an index does not need to be created immediately, but when the database has vacant resources, the index is created asynchronously for each data record in the data block newly written into the ledger. The asynchronous creation method helps the database server store resources.

In the index table, because one service attribute can be corresponding to multiple pieces of location information (that is, corresponding to multiple data records), when the location information is written into the index, the location information can be sequentially arranged based on an order of the data records in the ledger, thereby facilitating query and verification by the user. The order of the data records in the ledger can be embodied by timestamps (that is, blocking timestamps of data blocks) when the data records are written into the ledger, and for data records in the same data block, can be embodied by ranking of the data records.

Figure 4:
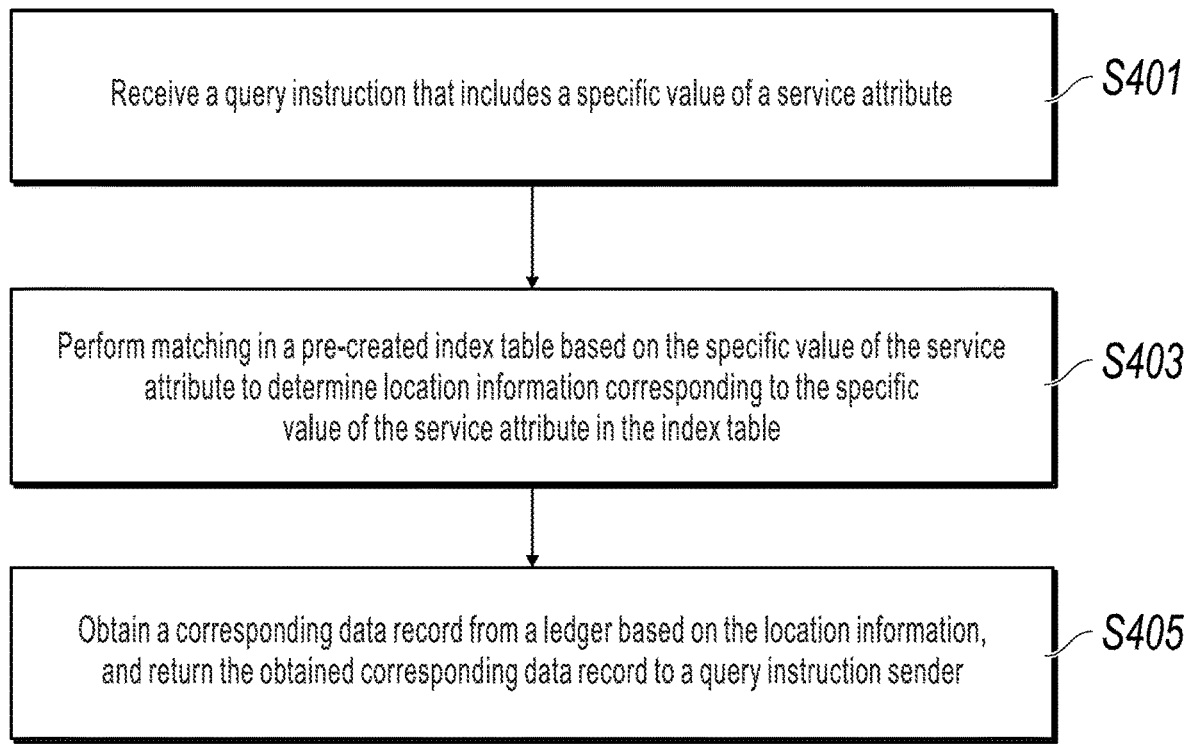
FIG. 4 is a schematic flowchart illustrating a method for querying a data record in a blockchain-type ledger, according to an implementation of the present specification.

After the index table is created, status query and statistics can be performed based on the index table. FIG. 4 is a schematic flowchart illustrating a method for querying a data record in a blockchain-type ledger, according to an implementation of the present specification. The method includes:

S401. Receive a query instruction that includes a specific value of a service attribute. Generally, a query request can be sent in the form of an instruction. The query request can come from a connected organization, or from a user served by the organization.

S403. Perform matching in a pre-created index table based on the specific value of the service attribute to determine location information corresponding to the specific value of the service attribute in the index table.

For example, after Table 1 is created, the user inputs a query instruction, Retrieve (0X123456, &v, FULL), to obtain location information (2,08), (2,10), (300,89), and (300,999) of data records corresponding to the service attribute "0X123456" from the index table, further obtain the corresponding data records by means of query based on the location information, and return the data records to the user.

S405. Obtain a corresponding data record from the ledger based on the location information, and return the obtained corresponding data record to a query instruction sender.

According to the solution provided in this implementation of the present specification, based on the pre-created inverted index that uses the service attribute as a primary key and uses the location information as a value, corresponding location information can be directly queried from the index based on the service attribute included in the query instruction, and then the corresponding data record is obtained based on the location information. In the previous method, by associating scattered data records in the ledger based on the service attribute by using the index record, data records corresponding to the same service attribute can be conveniently obtained through querying.

Further, the query can further include a block height parameter that is used to specify a data block interval. For example, a user inputs a query instruction, Retrieve (0X123456, &v, 100), to query data records of the specified user 0X123456 previous to the block height 100. Therefore, data records corresponding to location information (2,08) and (2,10) are obtained.

Or a segment of data blocks can be determined by two data block heights. For example, a user inputs a query instruction, Retrieve (0X123456, &v, 200, 1000), to query data records of the specified user 0X123456 between block height 200 and block height 1000 in the ledger. It can be understood that block height 300 fall into interval [200, 1000]. Therefore, location information corresponding to block height 300 is target location information, and therefore data records corresponding to target location information (300, 89) and (300, 999) are obtained.

In one implementation, a block height of a data block can be large integer data (which generally is monotonically increasing 12-bit to 15-bit integer data) obtained by performing symmetric encryption based on a blocking timestamp of the data block, for example, a 13-bit large integer. Because a large integer is obtained based on time symmetric encryption, when a blocking moment of a data block is required, the blocking moment can be obtained through the same symmetric decryption.

For example, for a blocking moment "20xx-01-19 03:14:07.938576", after symmetric encryption is performed, a large integer "1547838847938" can be obtained through conversion. Because integer data increases monotonically with time, "1547838847938" can be used as a block height of the data block and is used to identify the data block.

In the present specification, block heights are increased monotonically based on blocking moments. As such, even if large integer data is used, an order between them is still from small to large, which reflects an order between data blocks. For example, if a blocking moment of a next data block is "20xx-01-19 03:16:07.235125", a predetermined symmetric encryption algorithm can be used to convert the blocking moment into another larger integer "1547838848125".

In this method, when a user inputs a block height parameter (a database server can provide a moment-to-large integer conversion method, so the user obtains a block height parameter corresponding to the time) to determine a data block interval, a corresponding query time period is actually determined, that is, the user can perform query based on the time period. For example, the user can query, based on an ID (that is, a service attribute) of the user and a current time, data records generated by the user in a month or a day, or query data records generated within a specified time period, instead of performing traversal query among data blocks, thereby improving efficiency.

Figure 5:
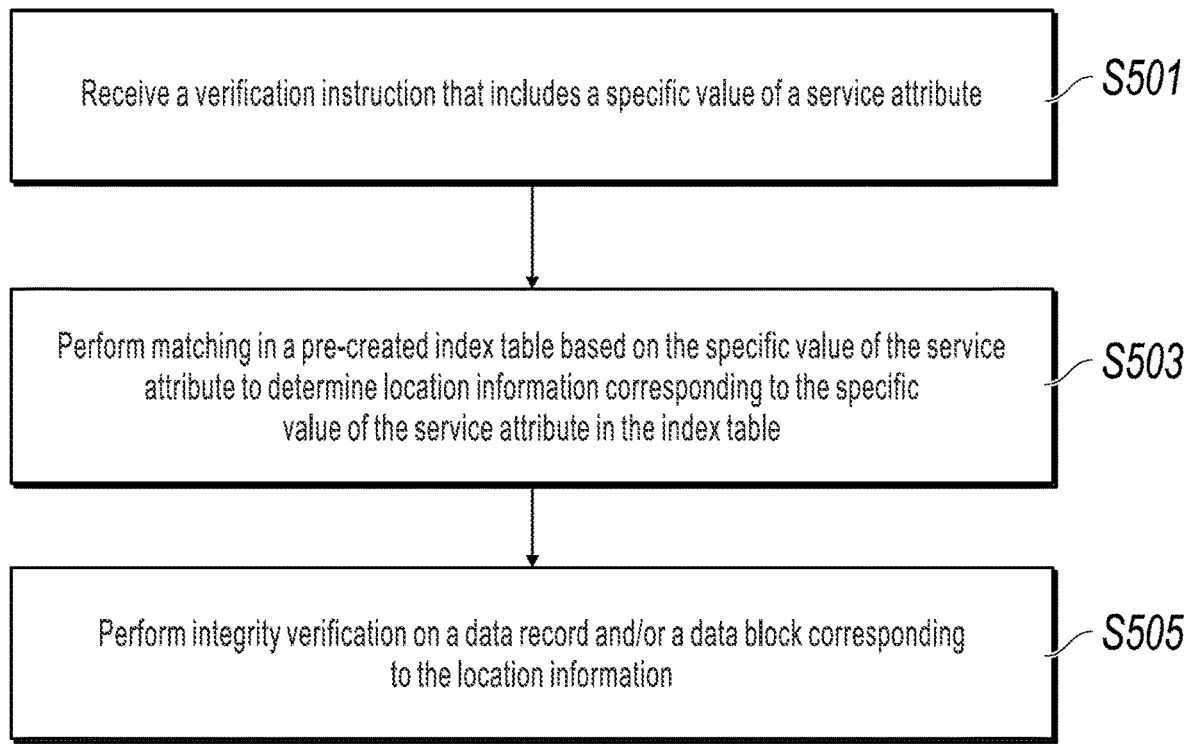
FIG. 5 is a schematic flowchart illustrating a method for verifying a data record in a blockchain-type ledger, according to an implementation of the present specification.

After the index is created, integrity verification on the data record can also be performed based on the index table. Integrity verification is used to verify whether a data record or a data block in which a data record is located is changed. FIG. 5 is a schematic flowchart illustrating a method for verifying a data record in a blockchain-type ledger, according to an implementation of the present specification. The method includes:

S501. Receive a verification instruction that includes a specific value of a service attribute. Generally, the verification request can be sent in a form of an instruction. The verification request can come from a connected organization, or from a user served by the organization.

S503. Perform matching in a pre-created index table based on the specific value of the service attribute to determine location information corresponding to the specific value of the service attribute in the index table.

For example, after Table 1 is created, the user enters a verification instruction, Verify (0X123456, &v, FULL), to obtain location information (2,08), (2,10), (300,89), and (300,999) of data records corresponding to a specific value of a service attribute "0X123456" through matching from the index table.

S505. Perform integrity verification on a data record and/or a data block corresponding to the location information.

A database server can learn, from the index, data records corresponding to the location information (2,08), (2,10), (300,89), and (300,999), and perform integrity verification on two data blocks whose block heights are 2 and 300.

Integrity of a data record is verified by obtaining the data record and determining a hash value of the data record and a hash value of another data record in a data block in which the data record is located, to form a Merkle tree and verify whether a root hash of the Merkle tree can be regenerated. A data block is verified by recalculating a hash value of the data block based on a hash value of a previous data block and a data record of the data block, and verifying whether the hash value is consistent with a previously calculated hash value.

A result returned during verification is "yes" or "no" metadata. In this case, the database server can add a signature of the server to the verification result. It can be understood that, by using the index provided in this implementation of the present specification, in a verification process in the blockchain-type ledger, the database server is unperceptive of specific service content, decoupling of data storage and service content is implemented, and different service organizations can be connected at the same time, which brings wider adaptability.

According to the solution provided in this implementation of the present specification, based on a pre-created inverted index that uses a service attribute as a primary key and uses location information as a value, location information corresponding to a service attribute can be matched from the index based on the service attribute included in a verification instruction, so as to obtain, based on the location information, a data record and a data block that are related to the service attribute, and during verification, saltatory integrity verification can be performed on the data record and the data block that are related to the service attribute, which is more flexible and more efficient.

Further, the verification can further include a block height parameter that is used to specify a data block interval. For example, a user inputs a verification instruction, Verify (0X123456, &v, 100), to verify whether data records of the specified user 0X123456 previous to the block height 100 are integral. Therefore, data records corresponding to location information (2,08) and (2,10) are obtained, and integrity verification is performed on them.

Or a segment of data blocks can be determined by two data block heights. For example, a user inputs a verification instruction, Verify (0X123456, &v, 200, 1000), to verify data records of the specified user 0X123456 between block height 200 and block height 1000 in the ledger. It can be understood that block height 300 fall into interval [200, 1000]. Therefore, location information corresponding to block height 300 is target location information, and therefore data records corresponding to target location information (300, 89) and (300, 999) are obtained and verified.

In one implementation, a block height of a data block can be large integer data (which generally is monotonically increasing 12-bit to 15-bit integer data) obtained by performing symmetric encryption based on a blocking timestamp of the data block, for example, a 13-bit large integer. Because a large integer is obtained based on time symmetric encryption, when a blocking moment of a data block is required, the blocking moment can be obtained through the same symmetric decryption.

For example, for a blocking moment "20xx-01-19 03:14:07.938576", after symmetric encryption is performed, a large integer "1547838847938" can be obtained through conversion. Because integer data increases monotonically with time, "1547838847938" can be used as a block height of the data block and is used to identify the data block.

In the present specification, block heights are increased monotonically based on blocking moments. As such, even if large integer data is used, an order between them is still from small to large, which reflects an order between data blocks. For example, if a blocking moment of a next data block is "20xx-01-19 03:16:07.235125", a predetermined symmetric encryption algorithm can be used to convert the blocking moment into another larger integer "1547838848125".

In this method, when a user inputs a block height parameter (a database server can provide a moment-to-large integer conversion method, so the user obtains a block height parameter corresponding to the time) to determine a data block interval, a corresponding time period needed for verification is actually determined, that is, the user can perform verification based on the specified time period. For example, the user can verify, based on an ID (that is, a service attribute) of the user and a current time, integrity of data records generated by the user in a month or a day, or verify data records generated within a specified time period, instead of performing traversal verification among data blocks, thereby improving efficiency.

Figure 6:
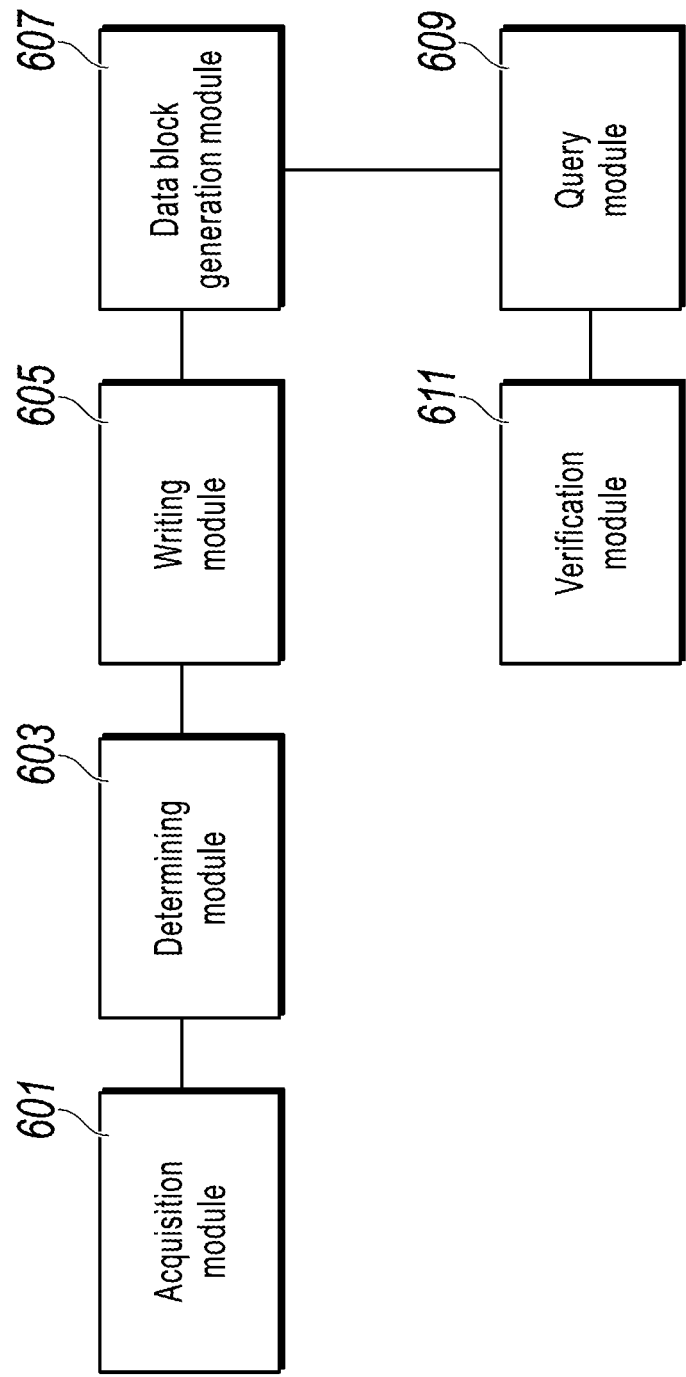
FIG. 6 is a schematic structural diagram illustrating an index creation apparatus for a data record, according to an implementation of the present specification.

Corresponding to one aspect, an implementation of the present specification further provides an index creation apparatus for a data record, and the apparatus is applied to a centralized database server that stores data by using a blockchain-type ledger. FIG. 6 is a schematic structural diagram illustrating an index creation apparatus for a data record, according to an implementation of the present specification, and the apparatus includes: an acquisition module 601, configured to obtain a specified identifier in a data record, where the specified identifier is used to identify a service attribute of the data record; a determining module 603, configured to determine location information of the data record in the ledger, where the location information includes a block height of a data block in which the data record is located and an offset of the data record in the data block; and a writing module 605, configured to establish a correspondence between the specified identifier and the location information, and write the location information into an index that uses specified identifiers as primary keys; where in the blockchain-type ledger, except an initial data block, each data block includes at least one data record, each data block includes a hash value of the data block determined based on a hash value of a previous data block and the data record included in the data block, and block heights of data blocks are increased monotonically based on an order of blocking moments.

Further, the acquisition module 601 is configured to obtain a specified identifier in a data record when the data record sent by a user is received; or determine a data record included in a data block in the ledger, and obtain a specified identifier of any data record included in the data block.

Further, the writing module 605 is configured to: when the primary keys in the index do not include the specified identifier, create, in an index table, an index record that uses the specified identifier as the primary key; and when the primary keys in the index include the specified identifier, write the location information into an index record corresponding to the specified identifier.

Further, the writing module 605 is configured to determine timestamps of data records; and in the same index record, sequentially write location information of the data records into Value of the index record based on an order of timestamps.

Further, on the centralized database server, a data block generation module 607 is further included and is configured to receive to-be-stored data records and determine a hash value of each data record, where the data record includes a specified identifier; and when a predetermined blocking condition is satisfied, determine each data record to be written into a data block to generate an Nth data block that includes a hash value of the data block and the data record, including: when N=1, determining a hash value and a block height of an initial data block based on a predetermined method; and when N>1, determining a hash value of the Nth data block based on each data record to be written into the data block and a hash value of an (N−1)th data block, to generate the Nth data block that includes the hash value of the Nth data block and each data record, where block heights of data blocks are increased monotonically based on an order of blocking moments.

Further, the predetermined blocking condition includes: the quantity of to-be-stored data records reaches a quantity threshold; or a time interval counting from a previous blocking moment reaches a time threshold.

Figure 7:
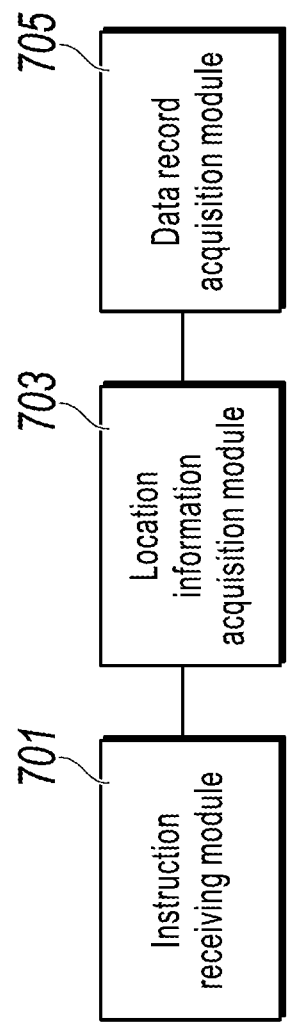
FIG. 7 is a schematic structural diagram illustrating an apparatus for querying a data record, according to an implementation of the present specification.

Corresponding to another aspect, an implementation of the present specification further provides an apparatus for querying a data record in a blockchain-type ledger based on the previous index. FIG. 7 is a schematic structural diagram illustrating an apparatus for querying a data record, according to an implementation of the present specification, and the apparatus includes: an instruction receiving module 701, configured to receive a query instruction that includes a specific value of a service attribute; a location information acquisition module 703, configured to perform matching in a pre-created index table based on the specific value of the service attribute to determine location information corresponding to the specific value of the service attribute in the index table; and a data record acquisition module 705, configured to obtain a corresponding data record from the ledger based on the location information, and return the obtained corresponding data record to a query instruction sender.

Further, the instruction receiving module 701 is configured to receive a query instruction that includes a block height parameter used to specify a query interval; and correspondingly, the data record acquisition module 705 is configured to determine, in the location information corresponding to the specific value of the service attribute, target location information of which a block height falls within the query interval, and obtain a data record corresponding to the target location information.

Figure 8:
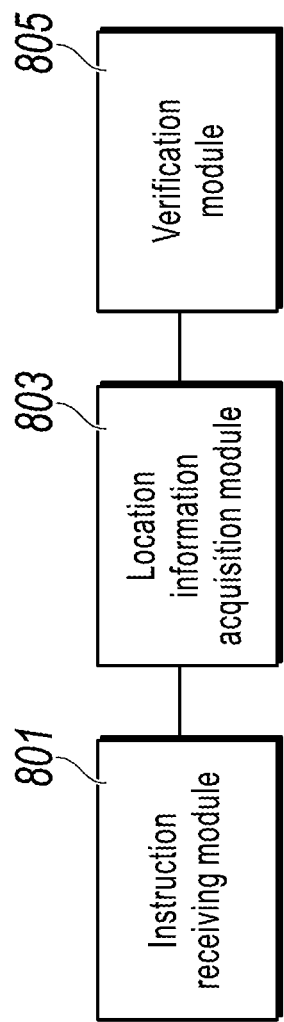
FIG. 8 is a schematic structural diagram illustrating an apparatus for verifying a data record, according to an implementation of the present specification.

Corresponding to still another aspect, an implementation of the present specification further provides an apparatus for verifying a data record in a blockchain-type ledger based on the previous index. FIG. 8 is a schematic structural diagram illustrating an apparatus for verifying a data record, according to an implementation of the present specification, and the apparatus includes: an instruction receiving module 801, configured to receive a verification instruction that includes a specific value of a service attribute; a location information acquisition module 803, configured to perform matching in a pre-created index table based on the specific value of the service attribute to determine location information corresponding to the specific value of the service attribute in the index table; and a verification module 805, configured to perform integrity verification on a data record and/or a data block corresponding to the location information.

Further, the instruction receiving module 801 is configured to receive a verification instruction that includes a block height parameter used to specify a verification interval; and correspondingly, the verification module 805 is configured to determine, in the location information corresponding to the specific value of the service attribute, target location information of which a block height falls within the verification interval, and perform integrity verification on a data record and/or a data block corresponding to the target location information.

An implementation of the present specification further provides a computer device. The computer device includes at least a memory, a processor, and a computer program that is stored in the memory and that can run on the processor. When executing the program, the processor implements the index creation method for a data record shown in FIG. 3.

An implementation of the present specification further provides a computer device. The computer device includes at least a memory, a processor, and a computer program that is stored in the memory and that can run on the processor. When executing the program, the processor implements the method for querying a data record shown in FIG. 4.

An implementation of the present specification further provides a computer device. The computer device includes at least a memory, a processor, and a computer program that is stored in the memory and that can run on the processor. When executing the program, the processor implements the method for verifying a data record shown in FIG. 5.

Figure 9:
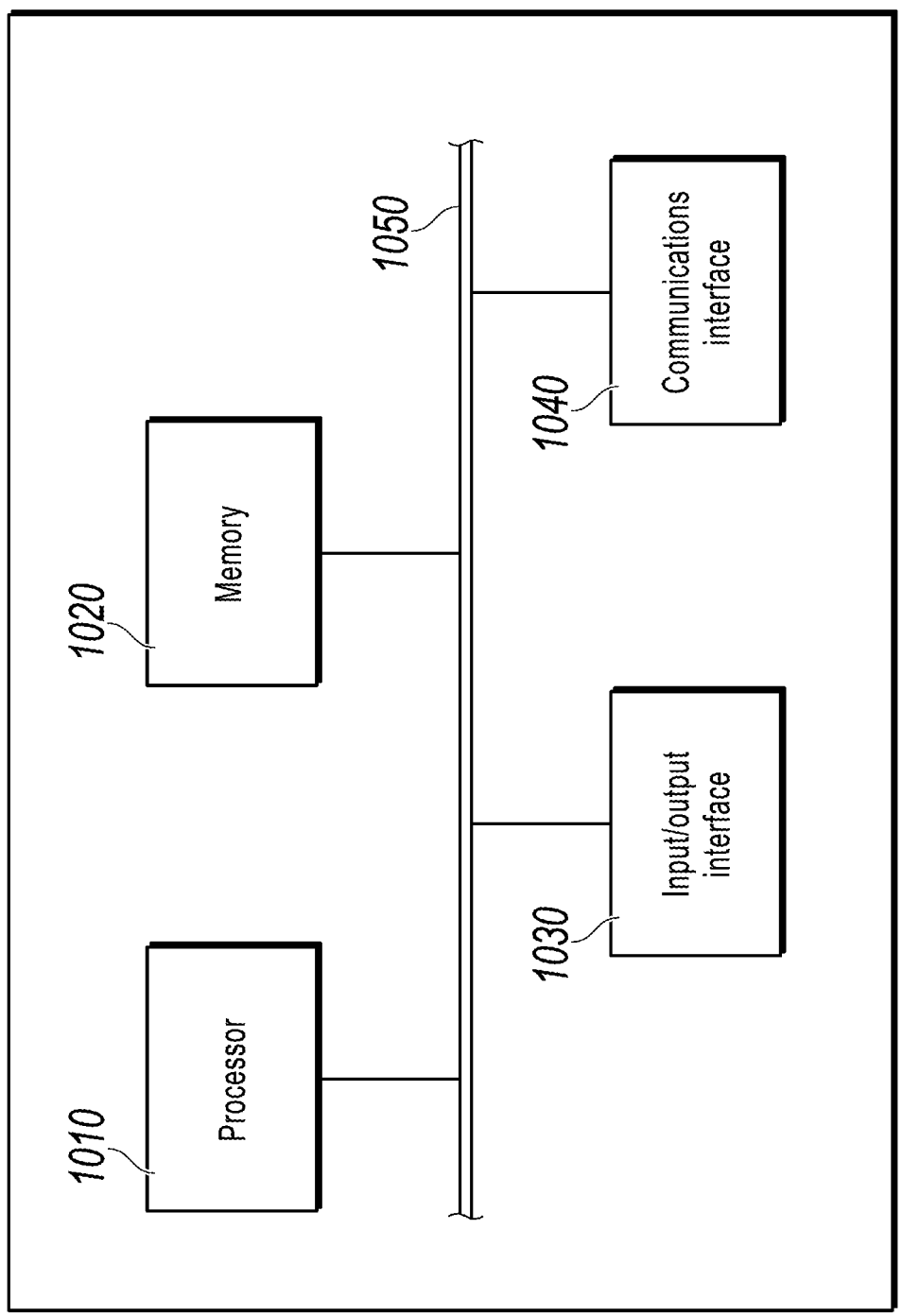
FIG. 9 is a schematic structural diagram illustrating a device used to configure a method in an implementation of the present specification.

FIG. 9 is a more detailed schematic diagram illustrating a hardware structure of a computing device, according to an implementation of the present specification. The device can include a processor 1010, a memory 1020, an input/output interface 1030, a communications interface 1040, and a bus 1050. The processor 1010, the memory 1020, the input/output interface 1030, and the communications interface 1040 are communicatively connected to each other inside the device by using the bus 1050.

The processor 1010 can be implemented by using a general central processing unit (CPU), a microprocessor, an application-specific integrated circuit (ASIC), one or more integrated circuits, etc., and is configured to execute a related program, so as to implement the technical solutions provided in the implementations of the present specification.

The memory 1020 can be implemented by using a read-only memory (ROM), a random access memory (RAM), a static storage device, a dynamic storage device, etc. The memory 1020 can store an operating system and another application program. When the technical solutions provided in the implementations of the present specification are implemented by using software or firmware, related program code is stored in the memory 1020, and is invoked and executed by the processor 1010.

The input/output interface 1030 is configured to be connected to an input/output module, to input or output information. The input/output module (not shown in the figure) can be used as a component and configured in the device, or can be externally connected to the device, to provide a corresponding function. The input module can include a keyboard, a mouse device, a touchscreen, a microphone, various sensors, etc. The output module can include a monitor, a speaker, a vibrator, an indicator, etc.

The communications interface 1040 is configured to be connected to a communications module (not shown in the figure), to implement a communication interaction between the device and another device. The communications module can perform communication in a wired way (for example, USB or a network cable), or can perform communication in a wireless way (for example, a mobile network, Wi-Fi, or Bluetooth).

The bus 1050 includes one channel, used to transmit information between components (for example, the processor 1010, the memory 1020, the input/output interface 1030, and the communications interface 1040) of the device.

It is worthwhile to note that although only the processor 1010, the memory 1020, the input/output interface 1030, the communications interface 1040, and the bus 1050 of the device are shown, during specific implementation, the device can further include other components needed for implementing normal running. In addition, a person skilled in the art can understand that the device can include only components necessary for implementing the solutions in the implementations of the present specification, but does not necessarily include all components shown in the figure.

An implementation of the present specification further provides a computer readable storage medium on which a computer program is stored. When being executed by a processor, the program implements the index creation method for a data record shown in FIG. 3.

An implementation of the present specification further provides a computer readable storage medium on which a computer program is stored. When being executed by a processor, the program implements the method for querying a data record shown in FIG. 4.

An implementation of the present specification further provides a computer readable storage medium on which a computer program is stored. When being executed by a processor, the program implements the method for verifying a data record shown in FIG. 5.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present application, the computer readable medium does not include computer readable transitory media such as a modulated data signal and a carrier.

It can be understood from the previous descriptions of the implementations that, a person skilled in the art can clearly understand that the implementations of the present specification can be implemented by using software and a necessary general hardware platform. Based on such an understanding, the technical solutions in the implementations of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the implementations of the present specification or in some parts of the implementations of the present specification.

The system, method, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

The implementations in the present specification are described in a progressive way. For same or similar parts of the implementations, references can be made to the implementations. Each implementation focuses on a difference from other implementations. Particularly, a device implementation is similar to a method implementation, and therefore is described briefly. For a related part, references can be made to some descriptions in the method implementation. The previously described apparatus implementations are merely examples. The modules described as separate parts can or cannot be physically separate. During implementation of the solutions in the implementations of the present application, functions of the modules can be implemented in one or more pieces of software and/or hardware. Some or all of the modules can be selected based on an actual need to implement the solutions of the implementations. A person of ordinary skill in the art can understand and implement the implementations of the present application without creative efforts.

The previous descriptions are merely specific implementations of the implementations of the present application. It is worthwhile to note that a person of ordinary skill in the art can further make several improvements or polishing without departing from the principle of the implementations of the present application, and the improvements or polishing shall fall within the protection scope of the implementations of the present application.

What is claimed is:

1. A computer-implemented index creation method comprising:
   obtaining, by a server storing data in a blockchain ledger, an identifier, wherein the identifier identifies an attribute value of a data record;
   determining location information of the data record in the blockchain ledger, wherein the location information comprises a block height of a data block in which the data record is located and an offset of the data record in the data block; and
   writing the location information into an index, wherein the index stores a correspondence between the location information and the attribute value, the attribute value being used as a primary key in the index, wherein writing the location information into the index comprises
      determining whether the attribute value is used as a pre-existing primary key in the index, and
      creating a first index record in the index, wherein the first index record uses the attribute value as the primary key, responsive to determining that the attribute value is not used as the pre-existing primary key, or
      writing the location information into a second index record in the index, wherein the second index record corresponds to the attribute value, responsive to determining that the attribute value is used as the pre-existing primary key,
   wherein each data block in the blockchain ledger after an initial block comprises at least one data record,
   wherein each data block in the blockchain ledger after the initial block comprises a hash value of the data block, wherein the hash value of the data block is based on a hash value of a previous data block to the data block and on a data record included in the data block, and
   wherein block heights of all data blocks in the blockchain ledger increase monotonically based on an order of times of the data blocks being written into the blockchain ledger.

2. The computer-implemented method of claim 1, wherein writing the location information into the second index record corresponding to the attribute value comprises:
   determining timestamps of a plurality of data records comprising the attribute value; and
   in the second index record corresponding to the attribute value, writing location information of each data record of the plurality of data records based on an order of the timestamps of the plurality of data records.

3. The computer-implemented method of claim 1, comprising:
   receiving a query instruction comprising a second attribute value;
   performing matching in the index based on the second attribute value, to determine corresponding location information identifying a data record including the second attribute value;
   obtaining the data record including the second attribute value from the blockchain ledger; and
   returning the data record including the second attribute value to a sender of the query instruction.

4. The computer-implemented method of claim 3, wherein the query instruction comprises a block height parameter specifying a block interval, and wherein obtaining the data record including the second attribute value comprises:
   determining at least one data record identified in the corresponding location information, the at least one data record identified in the corresponding location information being in a data block having a block height within the block interval, and
   obtaining the at least one data record identified in the corresponding location information.

5. The computer-implemented method of claim 1, comprising:
   receiving a verification instruction comprising a second attribute value;
   performing matching in the index based on the second attribute value, to determine corresponding location information identifying a data record including the second attribute value; and
   performing integrity verification on the data record including the second attribute value.

6. The computer-implemented method of claim 5, wherein the verification instruction comprises a block height parameter specifying a block interval, and wherein performing integrity verification on the data record including the second attribute value comprises:
   determining at least one data record identified in the corresponding location information, the at least one data record identified in the corresponding location information being in a data block having a block height within the block interval, and
performing integrity verification on the at least one data record identified in the corresponding location information.

7. A non-transitory, computer-readable medium storing one or more instructions executable by a computer system to perform operations comprising:
obtaining, by a server storing data in a blockchain ledger, an identifier, wherein the identifier identifies an attribute value of a data record;
determining location information of the data record in the blockchain ledger, wherein the location information comprises a block height of a data block in which the data record is located and an offset of the data record in the data block; and
writing the location information into an index, wherein the index stores a correspondence between the location information and the attribute value, the attribute value being used as a primary key in the index, wherein writing the location information into the index comprises
determining whether the attribute value is used as a pre-existing primary key in the index, and
creating a first index record in the index, wherein the first index record uses the attribute value as the primary key, responsive to determining that the attribute value is not used as the pre-existing primary key, or
writing the location information into a second index record in the index, wherein the second index record corresponds to the attribute value, responsive to determining that the attribute value is used as the pre-existing primary key,
wherein each data block in the blockchain ledger after an initial block comprises at least one data record,
wherein each data block in the blockchain ledger after the initial block comprises a hash value of the data block, wherein the hash value of the data block is based on a hash value of a previous data block to the data block and on a data record included in the data block, and
wherein block heights of all data blocks in the blockchain ledger increase monotonically based on an order of times of the data blocks being written into the blockchain ledger.

8. The computer-readable medium of claim 7, wherein writing the location information into the second index record corresponding to the attribute value comprises:
determining timestamps of a plurality of data records comprising the attribute value; and
in the second index record corresponding to the attribute value, writing location information of each data record of the plurality of data records based on an order of the timestamps of the plurality of data records.

9. The computer-readable medium of claim 7, wherein the operations further comprise:
receiving a query instruction comprising a second attribute value;
performing matching in the index based on the second attribute value, to determine corresponding location information identifying a data record including the second attribute value;
obtaining the data record including the second attribute value from the blockchain ledger; and
returning the data record including the second attribute value to a sender of the query instruction.

10. The computer-readable medium of claim 9, wherein the query instruction comprises a block height parameter specifying a block interval, and wherein obtaining the data record including the second attribute value comprises:
determining at least one data record identified in the corresponding location information, the at least one data record identified in the corresponding location information being in a data block having a block height within the block interval, and
obtaining the at least one data record identified in the corresponding location information.

11. The computer-readable medium of claim 7, wherein the operations further comprise:
receiving a verification instruction comprising a second attribute value;
performing matching in the index based on the second attribute value, to determine corresponding location information identifying a data record including the second attribute value; and
performing integrity verification on the data record including the second attribute value.

12. The computer-readable medium of claim 11, wherein the verification instruction comprises a block height parameter specifying a block interval, and wherein performing integrity verification on the data record including the second attribute value comprises:
determining at least one data record identified in the corresponding location information, the at least one data record identified in the corresponding location information being in a data block having a block height within the block interval, and
performing integrity verification on the at least one data record identified in the corresponding location information.

13. A computer-implemented system, comprising:
one or more computers; and
one or more computer memory devices interoperably coupled with the one or more computers and having tangible, non-transitory, machine-readable media storing one or more instructions that, when executed by the one or more computers, cause the one or more computers to perform one or more operations comprising:
obtaining, by a server storing data in a blockchain ledger, an identifier, wherein the identifier identifies an attribute value of a data record;
determining location information of the data record in the blockchain ledger, wherein the location information comprises a block height of a data block in which the data record is located and an offset of the data record in the data block; and
writing the location information into an index, wherein the index stores a correspondence between the location information and the attribute value, the attribute value being used as a primary key in the index, wherein writing the location information into the index comprises
determining whether the attribute value is used as a pre-existing primary key in the index, and
creating a first index record in the index, wherein the first index record uses the attribute value as the primary key, responsive to determining that the attribute value is not used as the pre-existing primary key, or
writing the location information into a second index record in the index, wherein the second index record corresponds to the attribute value, responsive to determining that the attribute value is used as the pre-existing primary key, wherein each data block in the blockchain ledger after an initial block comprises at least one data record, wherein each data block in the blockchain ledger after the initial block comprises a hash value of the data block, wherein the hash value of the data block is based on a hash value of a previous data block to the data block and on a data record included in the data block, and wherein block heights of all data blocks in the blockchain ledger increase monotonically based on an order of times of the data blocks being written into the blockchain ledger.

14. The computer-implemented system of claim 13, wherein writing the location information into the second index record corresponding to the attribute value comprises:

determining timestamps of a plurality of data records comprising the attribute value; and in the second index record corresponding to the attribute value, writing location information of each data record of the plurality of data records based on an order of the timestamps of the plurality of data records.

15. The computer-implemented system of claim 13, wherein the operations further comprise:

receiving a query instruction comprising a second attribute value;

performing matching in the index based on the second attribute value, to determine corresponding location information identifying a data record including the second attribute value;

obtaining the data record including the second attribute value from the blockchain ledger; and returning the data record including the second attribute value to a sender of the query instruction.

16. The computer-implemented system of claim 15, wherein the query instruction comprises a block height parameter specifying a block interval, and wherein obtaining the data record including the second attribute value comprises:

determining at least one data record identified in the corresponding location information, the at least one data record identified in the corresponding location information being in a data block having a block height within the block interval, and obtaining the at least one data record identified in the corresponding location information.

17. The computer-implemented system of claim 13, wherein the operations further comprise:

receiving a verification instruction comprising a second attribute value;

performing matching in the index based on the second attribute value, to determine corresponding location information identifying a data record including the second attribute value; and performing integrity verification on the data record including the second attribute value.

\* \* \* \* \*